Aug. 30, 1949.  H. B. GARVIN  2,480,568
ELECTRICAL POWER DISTRIBUTION
AND CONTROL APPARATUS
Filed April 7, 1947  7 Sheets-Sheet 1

Inventor
Hilary B. Garvin

Aug. 30, 1949.  H. B. GARVIN  2,480,568
ELECTRICAL POWER DISTRIBUTION
AND CONTROL APPARATUS
Filed April 7, 1947
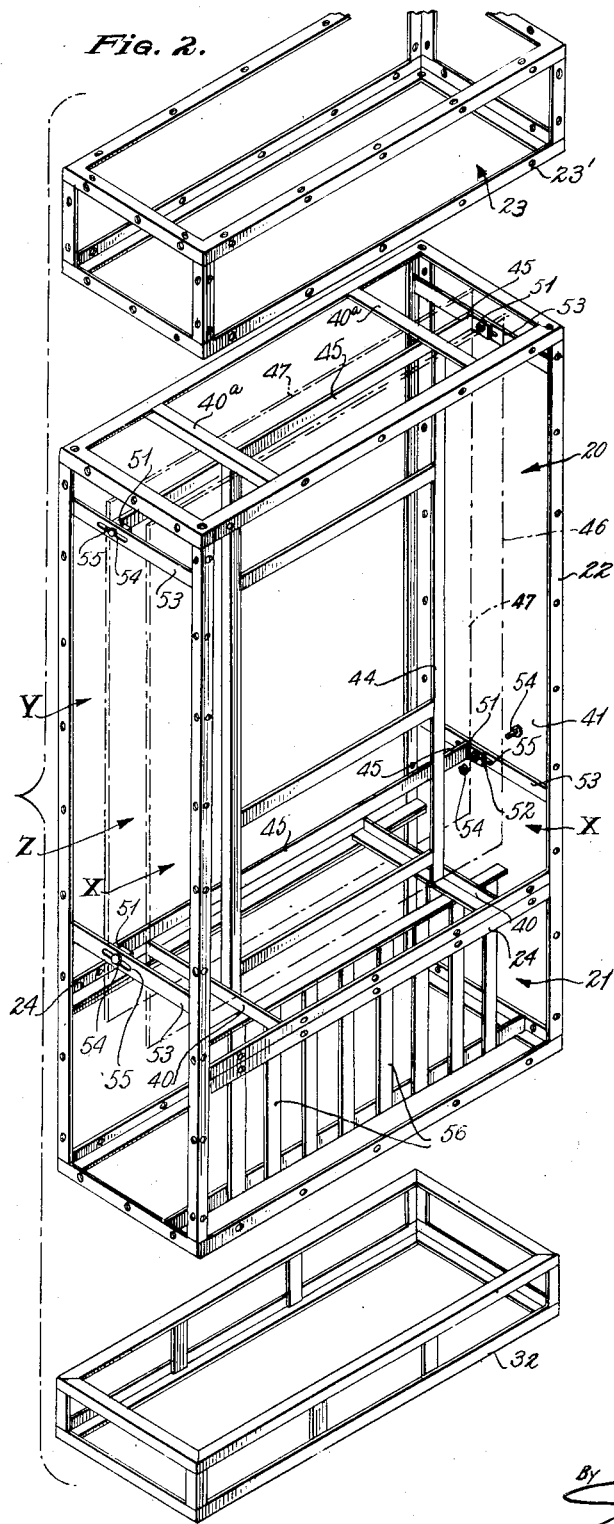
Fig. 2.
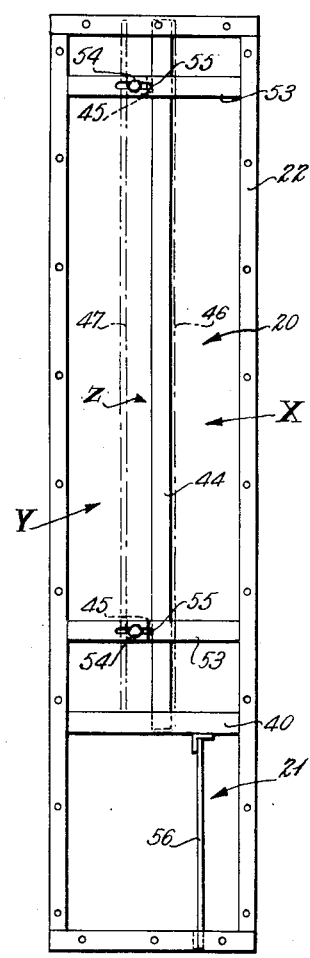
Fig. 3.
INVENTOR
Hilary B. Garvin
By
ATTORNEY Aug. 30, 1949.                    H. B. GARVIN                    2,480,568
                        ELECTRICAL POWER DISTRIBUTION
Filed April 7, 1947           AND CONTROL APPARATUS          7 Sheets-Sheet 3
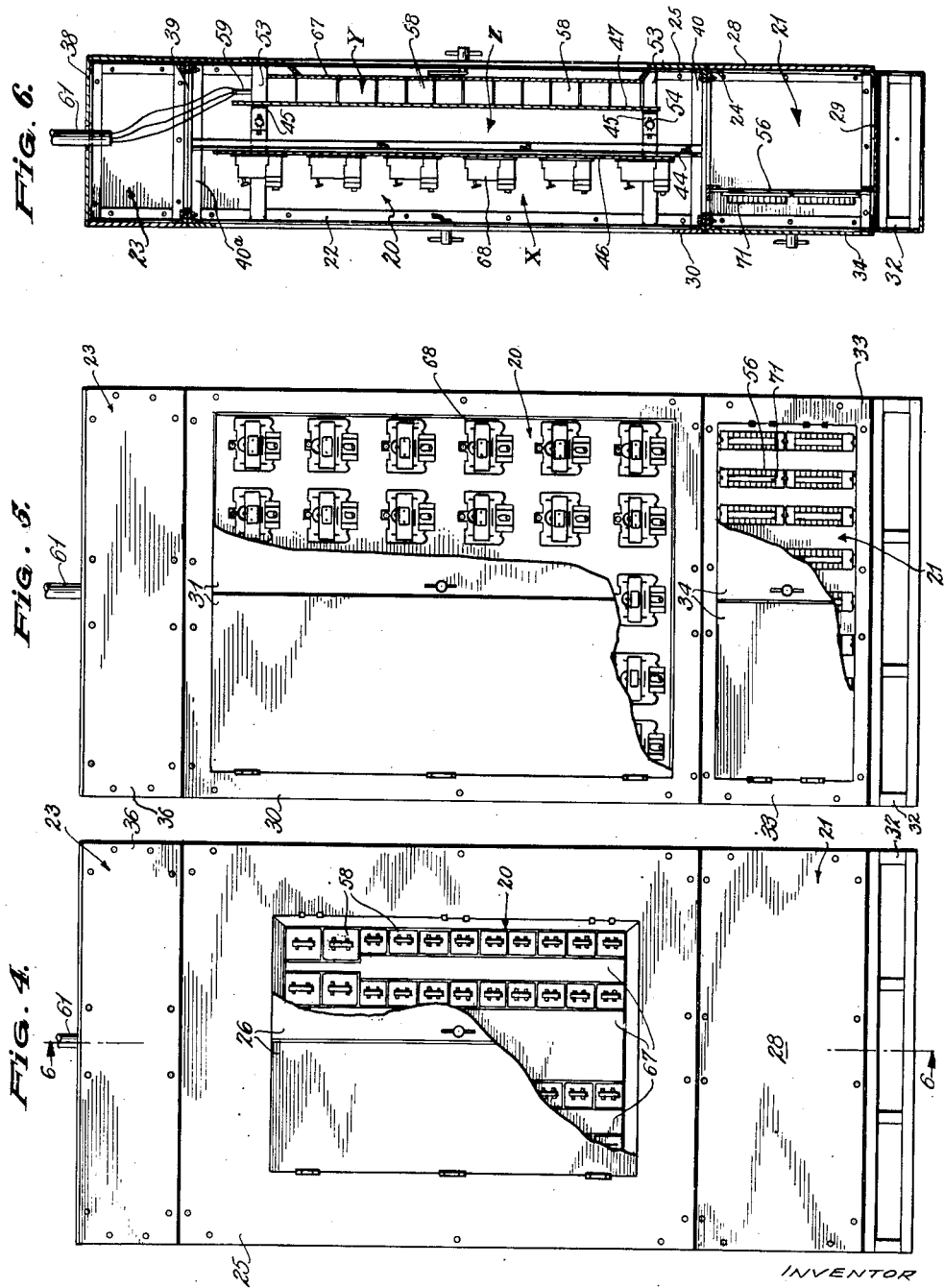
INVENTOR
Hilary B. Garvin

Aug. 30, 1949.  H. B. GARVIN  2,480,568
ELECTRICAL POWER DISTRIBUTION
AND CONTROL APPARATUS
Filed April 7, 1947  7 Sheets-Sheet 5

INVENTOR
Hilary B. Garvin
ATTORNEY

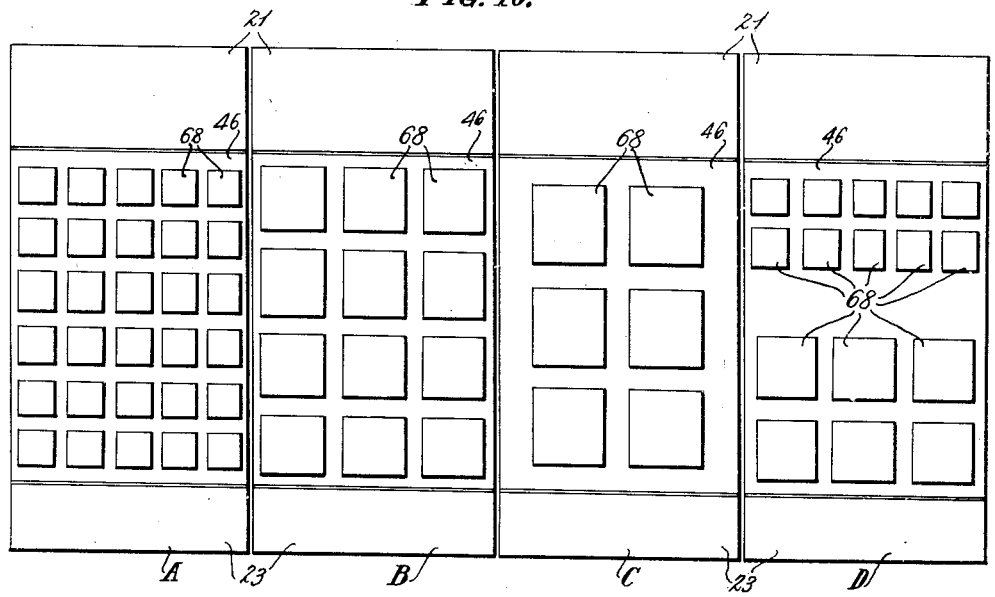
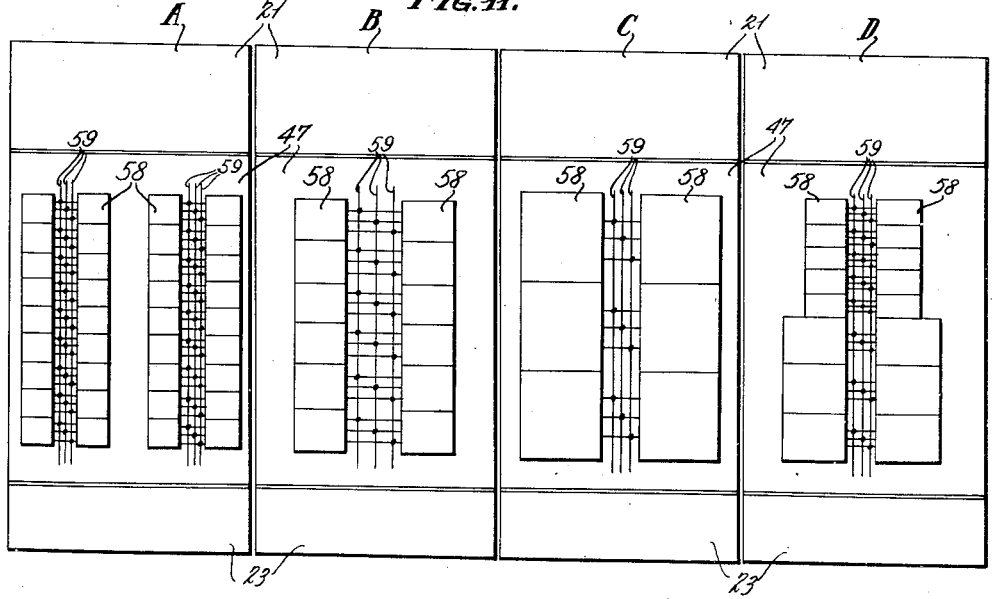

Aug. 30, 1949.   H. B. GARVIN   2,480,568
ELECTRICAL POWER DISTRIBUTION
AND CONTROL APPARATUS
Filed April 7, 1947   7 Sheets-Sheet 7
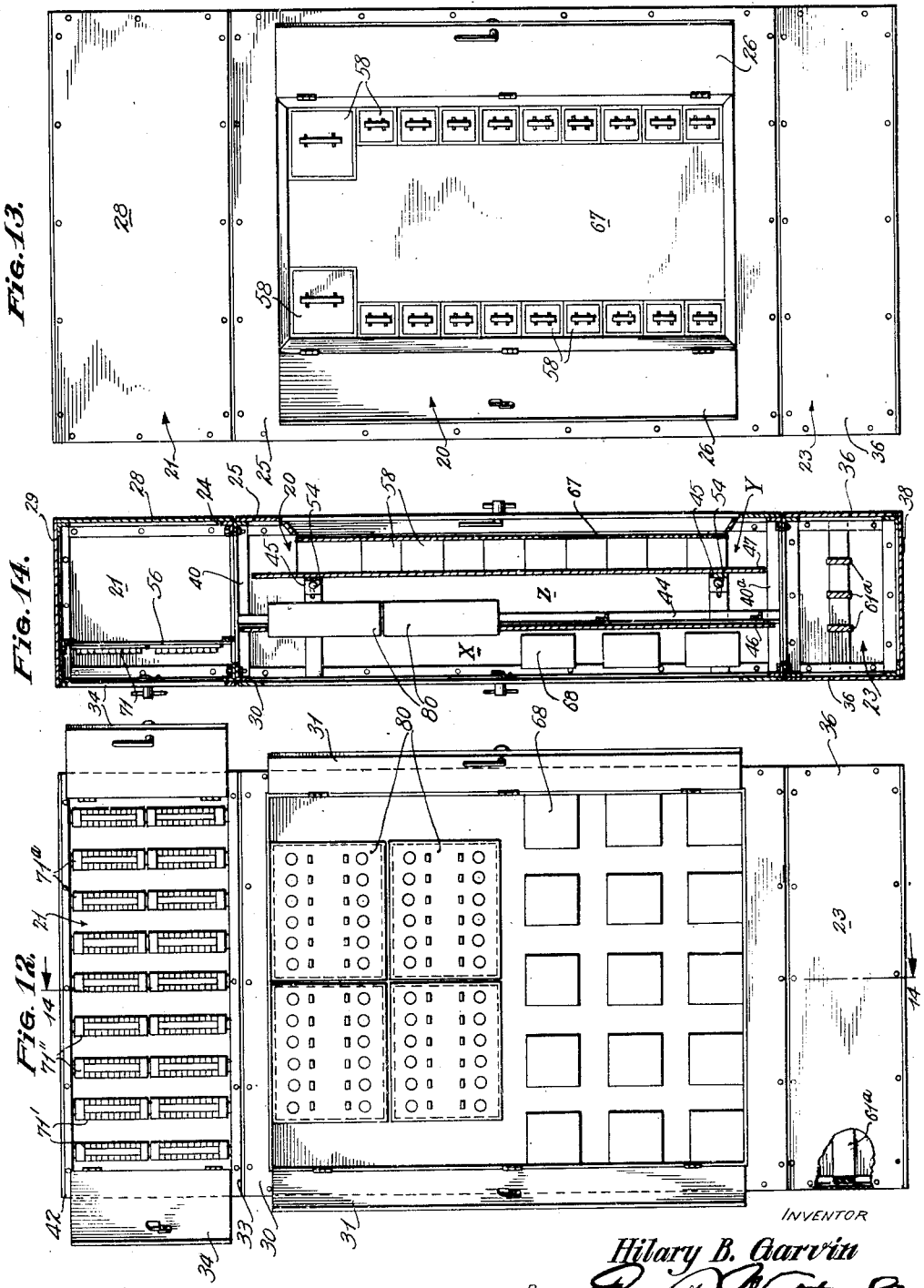
INVENTOR
Hilary B. Garvin
By
ATTORNEY Patented Aug. 30, 1949

2,480,568

UNITED STATES PATENT OFFICE 2,480,568

ELECTRICAL POWER DISTRIBUTION AND CONTROL APPARATUS

Hilary B. Garvin, Orlando, Fla.

Application April 7, 1947, Serial No. 739,932

5 Claims. (Cl. 175—307)

This invention relates to electrical control apparatus and more particularly to mounting means therefor, such as are commonly referred to as switchboards.

The switchboards or control installations, which are commonly in use, occupy a considerable amount of space and are so arranged that difficulty is experienced in installing in them the necessary standard control equipment. In industrial plants there is usually only a limited amount of space available for the installation of switchboards, and it is highly important to conserve the available space and, also, to arrange the installation so that additional control equipment may be installed or that a rearrangement of apparatus already installed may be quickly and easily effected. In the apparatus now available much space is needlessly consumed by the wiring as well as by the mountings for the control apparatus, and additional installations or changes in prior installations are both difficult and costly. These constructions usually comprise housings enclosing instrument panels with the instruments mounted on the front of the panels and the wiring in back of the panels. Such constructions are necessarily mounted along the walls of a room when they are installed and consequently they take up a great deal of space, are difficult to work with and require an extension of the power and control lines.

Having in mind the defects of the prior art apparatus, it is among the objects of the present invention to provide mounting means for either standard or special control devices which will enable a large number of devices to be used for like or different purposes and to be centralized with a substantial saving in space, with greater safety both to the attendant and to the devices and the wiring therefore, with a marked improvement in appearance of installation, and with greater accessibility of the control devices and the wiring thereof.

It is another object of the invention to provide a switchboard, or the like, which will be both economical in construction and highly flexible in its organization, so that it may be readily adapted to accommodate both present and future needs.

It is still another object of the invention to provide a switchboard construction in the form of a sectionalized control center and which may be assembled from relatively few parts, all of which are of simple construction and preferably formed of angle iron and sheet metal and is capable of quality production at low cost.

The foregoing objects and others ancillary thereto are preferably accomplished, in accordance with a preferred embodiment of the invention, by a sectionalized control unit comprising a sectionalized framework composed of angle irons welded together and of frames removably secured together, and mounting panels and cover plates removably mounted on said framework, certain of said cover plates having doors therein to permit ready access to said mounting panels. The structure is divided into three main sections including a bus section at one end, a terminal section at the other end and a central section that is sub-divided longitudinally into three sections comprising a magazine section on one side, an instrument section on the opposite side, and a conductor section between said magazine and instrument sections to enclose the wiring between the magazines and the instruments and between the instruments and the terminal blocks in the terminal section. By this arrangement the apparatus may be positioned with either end up so that the bus section may be positioned adjacent the incoming power feeder lines, that is toward the floor or the ceiling, depending upon the location of the feeder lines.

The central section is sub-divided by mounting panels, one of which is arranged to support the magazines, the other of which is adapted to support the control instruments so that the respective magazines and control instruments are supported back to back and in spaced relation to permit the running of the wiring therebetween and to provide a protected closed area for the wiring extending from the instruments to the terminal box. This latter wiring may include, if desired, both power and control conductors so that the instruments, if of the proper type, may be controlled by remotely positioned switches. One of the mounting panels is preferably slidably positioned so that it may be moved relative to the other panel to provide a greater space between said panels to facilitate a wiring operation, and doors are provided in the cover plates which are adapted for mounting on both sides of the central section and on the front of the terminal section whereby to permit ready access to the magazine panel, the instrument panel and the terminal blocks respectively.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with accompanying drawings, wherein like reference characters indicate like parts throughout and in which—

Fig. 2 is a view in perspective of the main frame of the apparatus;

Fig. 3 is a side view in elevation of the main frame of the apparatus with the mounting panels in position;

Fig. 4 is a view in elevation of the magazine side of the assembled control apparatus and with a portion of the doors broken away to show the magazines mounted therein;

Fig. 5 is a view in elevation of the instrument side of the assembled control of the apparatus and with a portion of both sets of doors broken away to show the assembled instruments in the central section and the terminal blocks in the terminal section;

Fig. 6 is a cross sectional view taken on a plane corresponding to line 6—6 of Fig. 4;

Figs. 10 and 11 are diagrammatic views showing the instrument and magazine sides respectively of a bank of switchboards or control assemblies in accordance with the present invention and illustrating their flexibility of use as to size and capacity of the control instruments assembled therein;

Fig. 12 is a view in elevation of the instrument side of an apparatus of the present invention and illustrating the flexibility of use of the present invention with respect to the type and capacity of control instruments that may be assembled therein;

Fig. 13 is a view in elevation of the magazine side of the apparatus shown in Fig. 2; and Fig. 14 is a diagrammatic cross sectional view taken on a plane corresponding to line 14—14 of Fig. 12.

A switchboard or control apparatus to overcome the defects hereinbefore enumerated should have the totally distinct characteristics of being capable of being inverted by a complete up-ending of the apparatus to accommodate previous wiring installations within the place of installation; it should be sectionalized to provide individual and free spaces for the various operational elements thereof; it should provide an arrangement of these spaces such as to conserve space and yet permit greater accessibility than heretofore possible; and it should provide a simplified construction comprising a minimum of standard parts and capable of a quality production but at great economy.

Figure 1:
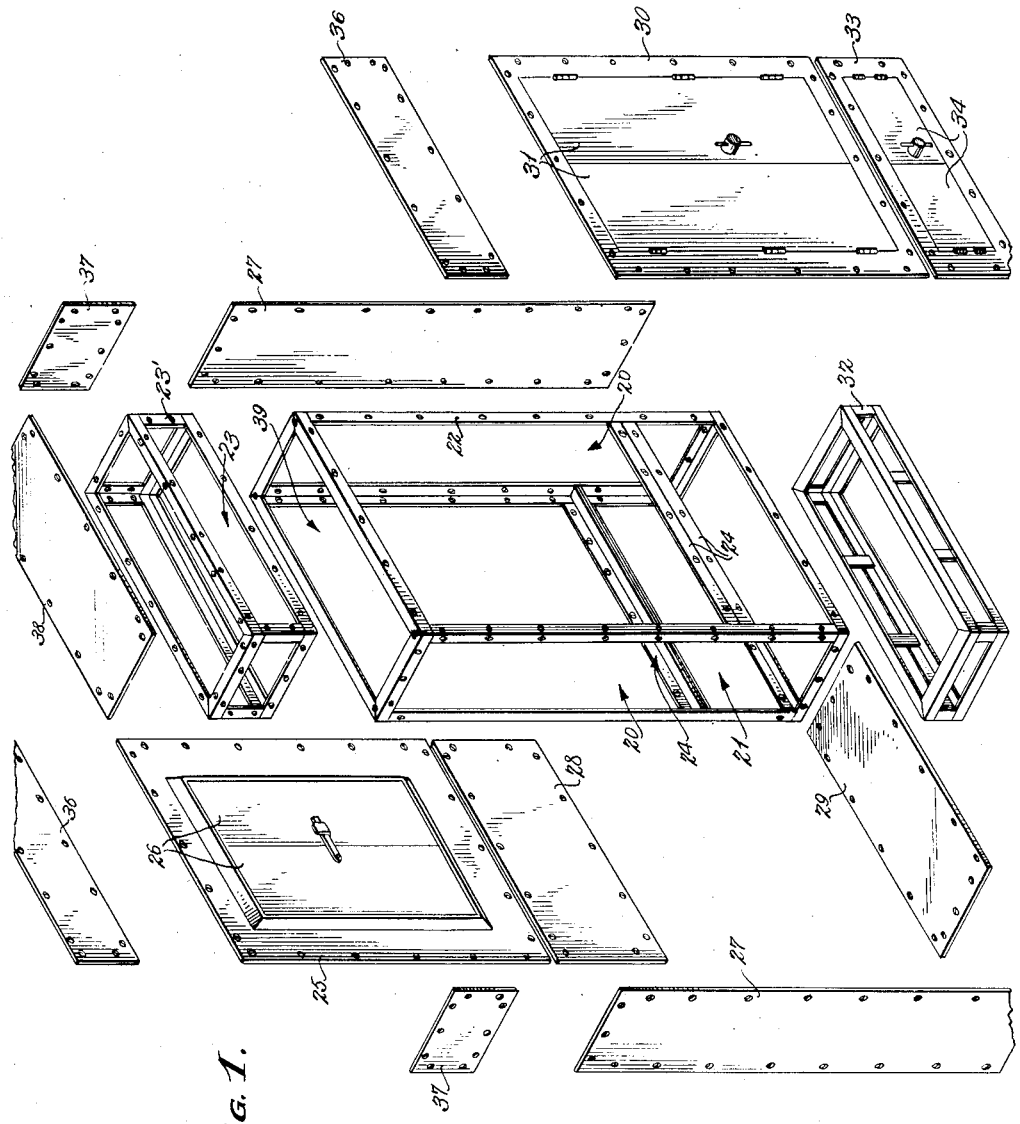
Fig. 1 is an exploded view in perspective illustrating the structural parts of the present invention.

Accordingly, a preferred embodiment of the invention, referring to Fig. 1 of the drawings, is constituted by a switchboard cabinet construction comprising a main or intermediate section 20 for containing panel boards, an end section 21 for containing terminal blocks and an auxiliary end section 23 for housing feed line bus bars. These sections are preferably, as shown, of rectangular box-like formation, the intermediate section 20 having a height greater than its width and a depth less than its width, the sections 21 and 23 having the same cross sectional dimensions of the intermediate section but having a height much less than that of the intermediate section. Of course, it is understood that the sections may be of other dimensions as may be found necessary or desirable so long as general organization and arrangement of parts of the present invention is adhered to. It is preferred to construct these sections by providing the frames of angle-bars and covering said frames with a plurality of plates or sheets removably attached thereto as by bolts or screws. As shown in Fig. 1, it is preferred to construct the sections 20 and 21 unitarily, but this is optional, and as a consequence the frame 22 is divided adjacent one end by the bars 24, while section 23 is constructed separately by bars 23' removably secured to the other end of section 20 by bolts or the like because there may be occasions when it is desirable to omit the section 23.

The cover plates are removably attached to the frames to provide a simplicity of structure and ease of assembly and, also to permit the uncovering of the apparatus to effect rewiring or rearrangement. For the sections 20 and 21, elongated plates 27 are provided to cover the entire upright side portions of the frame 22, a plate 25 having doors 26 therein is provided to cover the rear portion of the frame 22 above the dividing bar 24 and a smaller plate 28 is adapted to cover the rear of the frame 22, below the bar 24, also shown in Fig. 4. For the front of sections 20 and 21 is provided a plate 30 having doors 31 therein to cover the front portion of the frame 22 above the bar 24 and a plate 33 having doors 34 therein to cover the front face of the frame 22 below the bar 24, also shown in Fig. 5. The bottom of the frame 22 is covered by a plate 29 to close the terminal block section 21. For the bus-section 23, plates 36 are provided to cover the front and rear portions and plates 37 to cover the ends or sides and plate 38 to cover the top of the frame 23'. As the horizontal dimensions of the main section 20 and the auxiliary section 23 are identical the top plate 38 may be employed for covering the top end 39 of the main section 20 in the event that the auxiliary frame 23 is dispensed with. The pedestal or sub-frame 32 may be employed to function as an elevated base or support and it is usually left uncovered.

The assembled structure will, therefore, be divided into three sections, namely, the central panel section 20, the end terminal section 21, and the opposed bus-bar end section 23. In addition, the central section 20 is subdivided into three vertically disposed compartments from front to back by the opposed and spaced instrument mounting panels 46 and 47, namely, a front compartment x between the panel 46 and the front plate 30, a rear compartment y between the panel 47 and the rear plate 25, and an intermediate compartment z between the panels 46 and 47.

The arrangement of the cabinet, thus far described, and the use of the various parts thereof is best illustrated in Figs. 3, 6, 7 and 14, wherein it may be seen that the central section 20 provides for housing the various control apparatus, the end section 21 houses the terminals to which are connected the leads from the apparatus in the central section 20 and the leads to the current consuming devices that are controlled by the apparatus in the central section 20, and the other end section 23 is a bus section within which the main feeders or current supply conductors may be connected to leads running to the control apparatus in the central section 20. Furthermore, the central section 20 is divided into a rear or magazine compartment y for housing the magazines and the leads from the feeder lines or main supply conductors to the magazines, which are fully exposed by and accessible through doors 26, a front or instrument compartment x for housing the control instruments which are adapted to control the operation of the current consuming devices, which are fully exposed by and accessible through doors 31, and the intermediate or wiring compartment z for enclosing and confining the leads extending from the magazines in the compartment y to the instruments in the compartment x and from the instruments to the terminal section 21. In some installations, particularly those of smaller capacity, the bus section 23 may be eliminated and the feeder lines brought directly into the end 39 of the main section 20 into the magazine compartment y, in which case, of course, the end 39 of section 20 may be closed by the cover plate 38 through which a suitable opening or openings will be drilled to admit such lines.

The panels 46 and 47 extend preferably the length and width of the section 20 and are relatively adjustable toward and from each other. To accomplish this, the panels 46 and 47 may be mounted on frame 44 and 45 respectively, the frame 44 being rigidly fixed in position by horizontal cross-bars 40, extending between and supported by the division bars 24 of the cabinet frame 22, and by similar cross bars 40a extending between the top member of the cabinet frame 22; whereas the frame 45 may be adjustably mounted, as best shown in Figs. 2 and 3.

The frame 45 may comprise two vertically aligned and spaced horizontally disposed bars having their ends 51 turned at right angles and bolt holes 52 extend through said angular ends. The ends of said bars 45 are adjustably mounted on horizontal cross-members 53, which extend across the sides of the section 20, and have horizontal slots 55 therein. The angular ends 51 of the bars 45 are positioned flush with the insides of the cross-members 53 and adjustably secured thereto by bolts, or other suitable fasteners 54, which extend through the bolt holes 52 in the ends 51 and through the horizontal slots 55 in the cross members 53. This structure permits the panel 47 to be removably secured to the supporting bars or frame 45 and the panel 47 to be moved forwardly or rearwardly by means of said bolts 54 sliding in said slots 55 and to vary the depths of the magazine compartment y and the wiring compartment z. This arrangement is particularly advantageous in wiring the switchboard, as the panel 47 may be moved outwardly to enlarge the wiring compartment z during the wiring operation and then moved rearwardly upon the completion thereof, because the enlarged wiring area is not normally needed except to facilitate the wiring.

Figure 7:
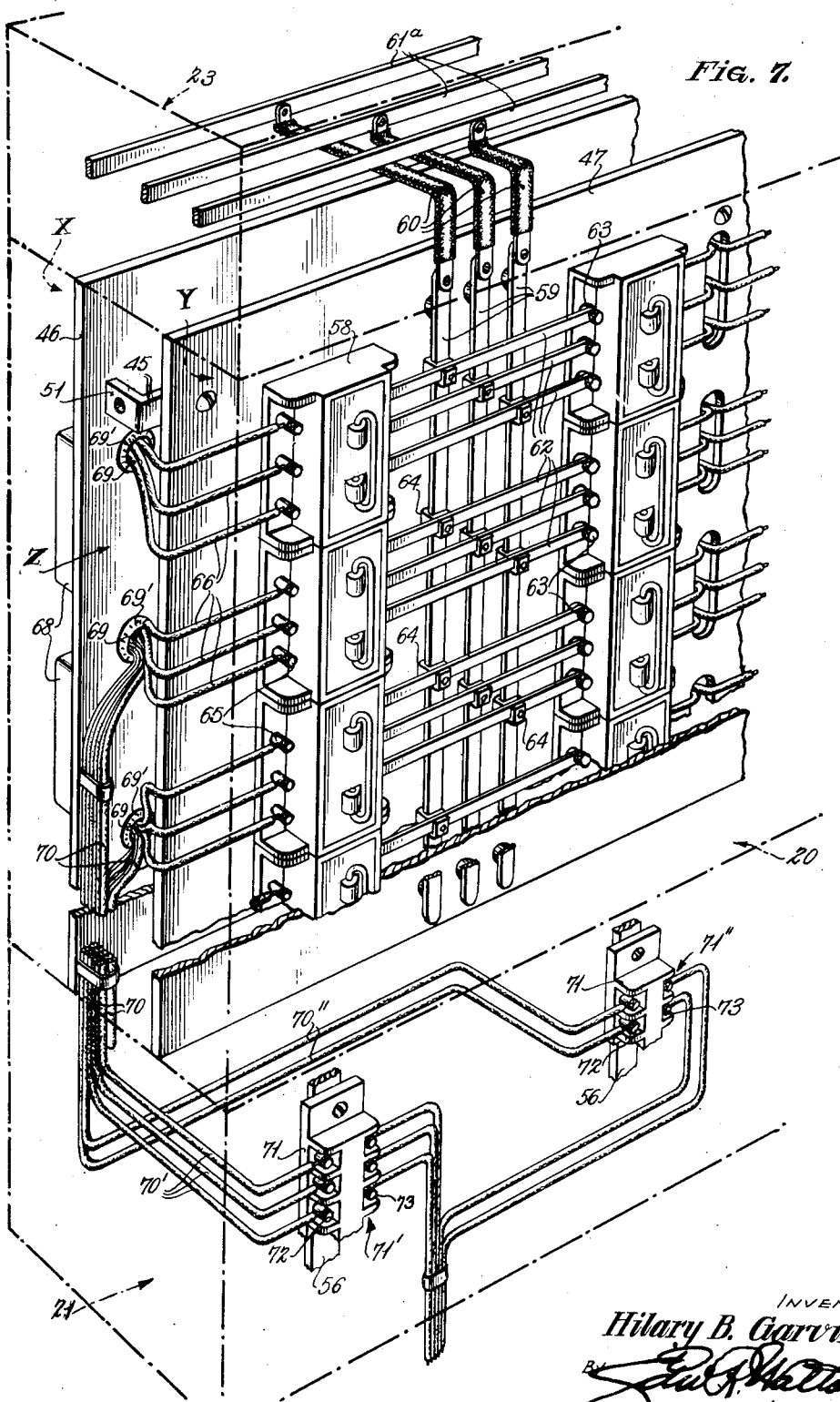
Fig. 7 is a fragmentary view in perspective showing the relative positioning of the magazines, starters, terminals and wiring therebetween; the terminal blocks being shown in the reverse to illustrate their detailed construction, for the purpose of this figure, from their actual position as shown in other figures.

A plurality of vertically disposed bars 56 are mounted in the terminal section 21 to provide supports for terminal blocks to which are connected the conductors between the instruments and the current consuming devices. As best shown in Fig. 7, the panel 47 is adapted to have a plurality of magazines 58 mounted thereon and it is also adapted to support a plurality of vertically disposed bus bars 59 which may be connected by leads 60 to the feeders 61 or main busses 61a in the bus section 23. The vertical bus bars 59 are adapted to receive electric current through the leads 60 from the main supply busses 61a and to supply such current to the magazines 58 through cross busses 62. The magazines 58 may comprise any suitable disconnecting device and fuse which will open an electric circuit by mechanical means, the fuse protecting the copper supplying the current consuming device which is supplied and controlled by the circuit. In Fig. 7, the magazines 58 are shown as being in the form of a standard type of fuse pull box, however, other types of equipment may be used. The magazines 58 are, preferably, arranged in pairs of vertical columns so that the connecting bus bars 59 may be conveniently mounted vertically on the panel 47 and between the pairs of columns of the magazines 58. This arrangement of spaced magazines 58 with the supply busses therebetween provides a compact orderly structure that saves considerable space and ready availability for work thereon by an attendant.

The cross busses 62 are horizontally positioned by connection with the receiving or input terminals 63 of a pair of the horizontally spaced magazines 58 and each of the cross busses 62 may be electrically connected with one of the vertical busses 59 by a suitable clamp 64. The supply or output terminals 65 of the magazines 58 are arranged to the outside, or opposite the bus terminals 63, so that they conveniently may be connected with conductors 66 which extend around the edge of, or through, the panel 47 and into the intermediate wiring or conductor compartment z. By this arrangement all of the current supply conductors and the magazines are conveniently and efficiently arranged on the front of the mounting panel 47 so that they are readily accessible upon opening the doors 26 in the face panel 25. For purposes of safety, it is preferred to cover the busses and conductors with protective panels 67 which lie flush with the faces of the magazines 58 as shown in Fig. 4. In the present instant a three phase circuit is shown to accommodate alternating current, however, it will be understood that the structure is not limited to this use. In addition it may be pointed out that the bus section 23 may accommodate feeder supply busses 61 in the form of a cable as shown in Fig. 6 or in the form of standard bus bars 61a as shown in Figs. 7, 12 and 14, the latter arrangement being preferred where a plurality of the switchboard units are combined or arranged side-by-side in a single assembly, in which latter case the adjacent end plates 37 of the sections 23 are removed and the bus-bars 61 extend the width of the assembled units.

The mounting panel 46 is adapted to have a plurality of instruments 68 mounted thereon and the instruments are shown as comprising motor starters, because the usual current consuming device comprises a motor. Other suitable instruments may be employed instead of the starters, however, or in combination therewith as shown in Fig. 12 wherein manual controls for single phase lighting circuits are illustrated. The panel 46 has a plurality of spaced apertures 69 therein (see Fig. 7) and the instruments 68 are mounted between two such apertures 69 which are vertically spaced so that supply conductors can be passed from the intermediate wiring compartment z through one of the apertures 69 to the instrument 68 through the other of the apertures 69 into the wiring compartment z and through the same to the terminal section 21. As the panel 46 is preferably of steel, the apertures 69 are insulated by collars 69', although the panels may be of any other material.

A typical assembly, is shown in Fig. 7 wherein it will be seen that the conductors 66, connected with the supply terminals 65 of a magazine 58, extend around the edge of the magazine panel 47 and transversely through the wiring compartment z to the instrument panel 46 and through the upper of a pair of spaced apertures 69, to an instrument 68 which is mounted on the opposite face of the instrument panel 46. Conductors 70 from the instruments 68, are passed through the aperture 69 which underlies the instrument 58 into the wiring compartment z and longitudinally through said section to the terminal section 21. The conductors 70 include the three phase transmission or current carrying conductors 70' and, if magnetically operated instruments 68 are employed, control conductors 70'' may also be included, both sets of these conductors being extended to the terminal section 21 and connected to their respective terminal blocks 71 which are mounted in the terminal section 21 on the supporting bars 56. There are three of the current carrying conductors 70' but normally there will be only two of the control conductors 70'' which run between a manual switch which is usually adjacent the current consuming device and a magnetically operated switch incorporated with each of the instruments 68.

The terminal blocks 71 may be of standard construction and comprise input terminals 72 and output terminals 73 and their use facilitates the connecting of the switchboard with the various current consuming devices which are to be controlled. That is, the switchboard is completely wired and the conductors 70 are connected with the input terminals 72 of the terminal block 71. The conductors 75 from the current consuming devices may then be run into the terminal section 21 and connected with the output terminals 73 of the blocks 71 to complete the circuit between a manual control switch adjacent its current consuming device, and the given control instrument 68, and between said instrument 68 and the current consuming device. This arrangement comprises a convenient system for connecting the various current consuming devices with the switchboard, as the only wiring operation that is necessary is that of running the connecting lines from the devices into the terminal section 21 and attaching the lines to a selected set of output terminals 73.

The terminal blocks 71 are preferably divided into two groups 71' and 71'' and the current carrying conductors 70' may be connected with the terminal blocks in the group 71' whereas the control conductors 70'' may be connected with the terminal blocks in the group 71''. The terminal block group 71' may all be assembled together upon one or more of the supporting bars 56 and to one side of the terminal section 21 whereas the control terminal blocks may be assembled as a group 71'' upon another of the supporting bars 56 and to the other side of the terminal section 21 or at least in a separate and distinct and closely associated group.

This arrangement has the decided advantage of assembling all of the terminal blocks 71 that are employed for the same purpose in one consolidated group so that they may be readily identified and connected up to the proper conductor lines. The close grouping and identification of the control blocks 71'' along with the control leads facilitates the interlocking or dual control of one or more current consuming devices or from one or more controlling stations such as the instruments 68. Furthermore the grouping of the terminal blocks 71 upon the spaced supporting bars 56 distributes the positioning of the blocks 71 across the width of the switchboard structure so that there is ample room for effecting the necessary wiring; and, moreover, the blocks 71 may be disposed in more or less vertical alignment with the control stations or instruments 68 with which they are associated so that a minimum of wiring is necessary and an orderly arrangement of the wiring is effected.

Figure 8:
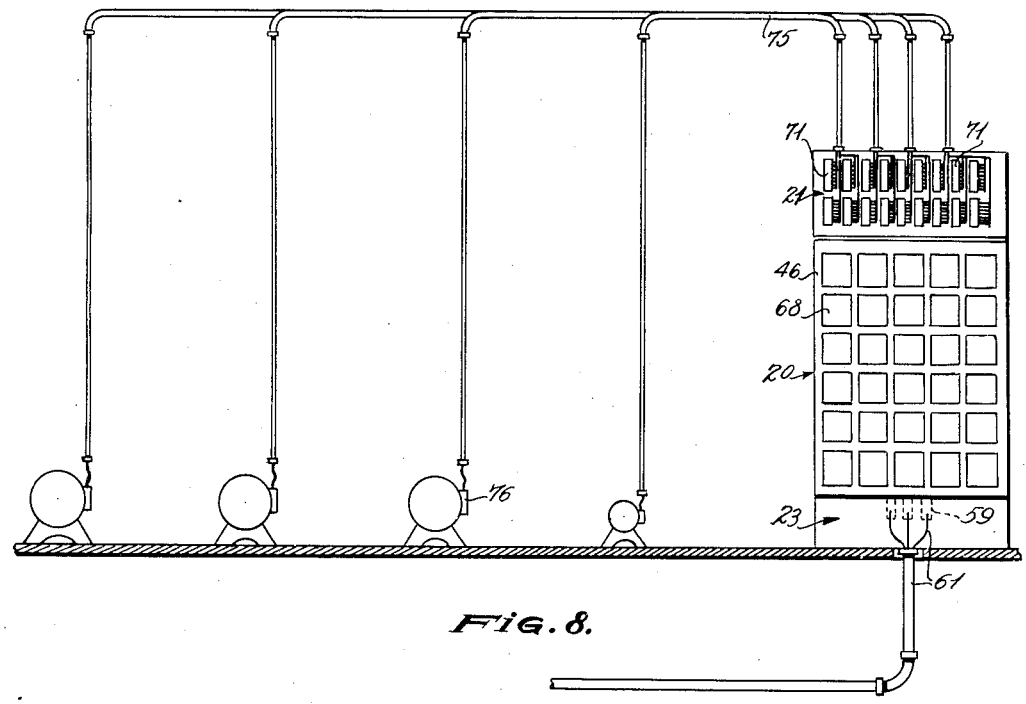
Figs. 8 and 9 are diagrammatic views illustrating the versatility of the use afforded by the present invention.
Figure 9:
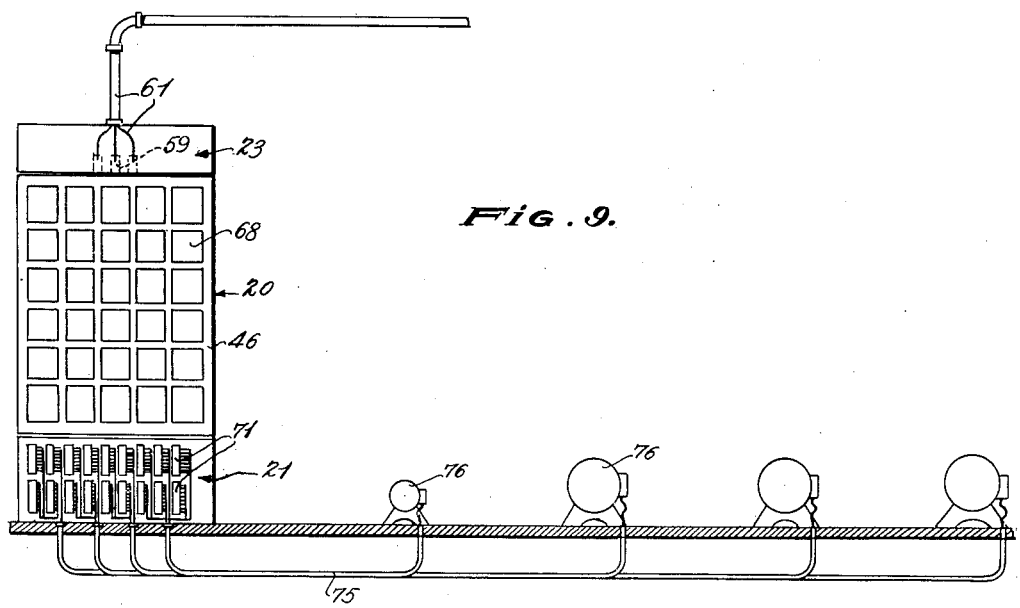

The versatility and flexibility of the switchboard comprising the present invention is virtually unlimited. As illustrated in Figs. 8 and 9, the switchboard may be installed with the terminal section 21 at the top and the bus section 23 at the bottom or, conversely, with the bus section 23 at the top and the terminal section 21 at the bottom, depending upon the prior installation of the feeder lines 61 and of the current carrying and control lines 75, or according to the convenience of running such lines of installation. In other words, if the main feeder lines 61 are installed within or beneath the floor of the plant in which a given installation is made, then the switchboard may be arranged with the bus section 23 at the bottom so that the connection between the feeders 61 and the vertical bus bars 59 may be made at the terminus of the feeders 61 and extended connecting lines with the vertical busses 59 are unnecessary. In an installation of this type, the connecting lines 75 between the terminal section 21 and the current consuming devices 76 may be extended from the top of the switchboard and along the ceiling of the industrial plant to the location of the particular current consuming devices 76. Conversely, if the feeder lines 61 are run along the ceiling of the plant, the bus section 43 may then be located at the top and the terminal section 21 located at the bottom of the switchboard, and the connecting lines 75 extended therefrom through or beneath the floor of the plant to the respective current consuming devices 76.

The flexibility of the unit also extends to the combination of capacity and number of current consuming devices that may be controlled by a given unit. This feature is best illustrated in Figs. 10 and 11 of the drawings which illustrate diagrammatically a bank of four units, Fig. 10 showing the instrument panels 46 of the switchboards and Fig. 11 showing the magazine panels 47 of the same units, which, in the two figures, are shown one above the other for ease of comparison rather than being reversed from left to right as would actually be the case.

In the switchboard, or unit A, it will be seen in Fig. 10, that this assembly comprises thirty of the motor starters or instruments 68 each of which, for instance, is adapted to control a maximum of thirty 5 H. P. current consuming devices. On the magazine side, shown in Fig. 11, the unit A will have four columns of magazines 58 with two sets of vertical bus bars 59 between the two pairs of said columns. It will be seen that there are thirty-six of the magazines 58 or spaces therefore, as compared to but thirty of the instruments 68, the extra magazines 58 being provided for the usual constant circuits, master control circuits, and the like which are run directly from the magazines and not through the instruments 68.

The next switchboard unit B may comprise twelve of the motor starters or instruments 68, each which may, for instance, control a maximum of 15 H. P. so that the unit will control a maximum of twelve motors or other current consuming devices 76, each having up to 15 H. P. capacity. The magazine section of the unit B contains two columns of magazines 58 with a single set of the vertical bus bars 59 therebetween.

In the unit C, on the instrument panel 46 shown in Fig. 10, there are six instruments 68, each of which is adapted to control, for example, a maximum of 30 H. P. and on the magazine panel 47, shown in Fig. 11, there are two columns of the magazines 58 with a single set of the vertical bus bars 59 therebetween.

In unit D on the instrument panel 46, as shown in Fig. 10, there are illustrated ten small instruments 68 which are adapted to control, for example, a maximum of ten 5 H. P. current consuming devices, and in the same instrument section are six large instruments 68 which are adapted to control, for instance, six 15 H. P. current consuming devices, and on the magazine panel 47 of this unit, as shown in Fig. 11, there are two columns of the magazine 58 with one set of the vertical bus bars 59 therebetween, part of the magazines 58 being large units of a capacity to accommodate the six 15 H. P. instruments 68 and the remainder of the magazines 58 being smaller units which will accommodate the 5 H. P. capacity of the smaller instrument 68.

Thus, it will be seen that the same switchboard organization, as hereinbefore described, may be readily adapted to provide any combination of capacity and number of current consuming devices to be controlled.

In addition to flexibility as to horsepower requirements, the present switchboard construction also has considerable flexibility as to the type of instruments and current characteristics that it is adapted to accommodate. This feature is illustrated in Figs. 12, 13 and 14, in which are shown a plurality of motor starters or instruments 68 and recessed manual control systems 80 in the instrument section with a combination of types of magazines 58 to accommodate both the instruments 68 and the manual control 80. In Fig. 12 it will be seen that there are fifteen of the instruments 68 with two of the manual control assemblies 80 which, as shown in Fig. 14, are recessed within the instrument panel 46. Referring back to Fig. 12, it will be seen that the three phase instruments 68 may be connected by current carrying conductors with the terminal group 71' and by control conductors with the terminal group 71'', whereas the single phase lighting circuits running from the manual controls 80 may extend to the terminal group 71a. On the magazine side, shown in Fig. 13, it will be seen that there are two large magazines 58 to accommodate the two manual control units 80 and a plurality of small magazines 58 to accommodate the instruments 68, and the constant and master circuits if such are desired.

In view of the foregoing description it is readily evident that the versatility and flexibility of the switchboard comprising the present invention affords economy of assembly and installation with considerable saving of space due to the unique construction that divides the assembly into a plurality of separate and distinct sections, each having one distinct function, one of said sections being further divided into three compartments for a distinct purpose, all of which have been so arranged as to provide extreme compactness. This organization includes the bus section 23 within which connection is made between the main feeder lines 61 and the apparatus within the unit, the magazine compartment y for housing the magazines and copper between the connection in the bus section and the magazines, and which section is readily accessible through the doors 26, a starter or instrument compartment x for housing the instruments 68 and 80 and which compartment is readily accessible through the doors 31, an intermediate wiring compartment z between the magazine compartment y and the instrument compartment x and for housing the wiring between the magazines 58 and the instruments 68 and supply and control lines 70 from the instruments 68, and the terminal section 21 in which all current carrying lines or conductors 70' and all control conductors 70'' from each of the instruments 68 are grouped and identified upon terminal blocks 71 and which are readily exposed and accessible through the doors 34 so that the conductors 75 from the current consuming devices may be hooked up with the output terminals 73 of the terminal blocks 71.

Furthermore, the organization is such that manufacturing and assembly may be rapid, economical and facile. The frame 22, 23' and 32 may be welded or removably bolted or otherwise fastened together, the cover plates and panels cut to size and have bolt holes bored therein and the operational equipment from the vertical bus bars 59 to the terminal blocks 71 may be installed in the main cabinet 20. The equipment may be shipped in separate sections as they may be handled more easily, and then the sections may be assembled at the place of installation. The installation operation is extremely simple inasmuch as the equipment is completely installed and all that is necessary is to hook it up to complete the circuits. The base pedestal 32 is placed on a firm, level supporting surface, the terminal section 21 is placed on the base 32 if the feeder lines 61 are overhead, as shown in Fig. 9, or the bus section 23 is mounted on the base 32 if the feeders 61 are underfoot as shown in Fig. 8, and the remaining sections placed on top of whichever section is previously installed in such order that the main section 20 is intermediate. The feeders 61 are then run into the bus section 23 and connected to the bus bars 61a or, as the installation permits or as may be desired, directly to the vertical bus bars 59, in which latter case the bus section 23 may be eliminated in some instances where only one cabinet unit is employed; and then control leads 75 are run into the terminal section 21 and connected to the output terminals 73 of the terminal blocks 71. The switchboard is then ready for operation.

Although certain specific embodiments of the invention have been shown and described it is obvious that many modifications thereof are possible. The invention, therefore, is not to be restricted, except insofar as is necessitated by the prior art and by the spirit of the appended claims.

That which is claimed as new is:

1. A switch panel construction comprising a housing divided into sections by framework, one of said sections being at one end of said housing and being open to accommodate main bus bars, another of said sections being an enlarged central section having a frame therein mounted toward one side thereof and supporting a panel, vertical bus bars mounted on said panel for connection with said main bus bars, control units mounted on said panel and connected to said vertical bus bars, a second frame mounted in said central section and spaced from said vertical frame toward the opposite side of said section, an instrument panel mounted on said second frame, doors in the sides of said housing in front of said panels, respectively, to permit access thereto, one of said frames being movably mounted to permit adjustable spacing of said panels relative to each other, said panels having conductor apertures, conductors extending between said panels from said control units to said instruments, another of said sections being at the other end of said housing forming a terminal section, supports positioned in said terminal section, terminal blocks for all of the incoming and outgoing operating conductors mounted on said supports, doors in said terminal section in front of said terminal blocks to permit access thereto, and electric power and control conductors extending from said instruments and between said panels to said terminal blocks.

2. Electrical control apparatus of the character described including, in combination, structural members forming a control board housing having front and rear faces, front and rear spaced, vertical panels one adjustable toward and from the other mounted within said housing, said front panel facing and spaced inwardly of the front face of the housing, said rear panel facing and spaced inwardly of the rear face of said housing, protective circuit breaking devices and electrical leads thereto mounted on the outer face of one of said panels, control instruments mounted on the outer face of the other panel, said panel having apertures for the passage of electrical conductors therethrough, electrical conductors extending from said protective devices into the space between said front and rear panels and through said rear panel apertures to said control instruments, and doors on the front and rear faces of the housing structures providing access to the protective devices and control instruments which are mounted on said panels, said housing being also formed by said structural members to have a compartment in open vertical relation to said panels, terminals for all the incoming and outgoing operating conductors mounted in said compartment, and electrical conductors connected to said terminals and adapted to be connected to electrical devices mounted on the mounting face of one of said panels.

3. Electrical control apparatus of the character described including, in combination, structural members forming a control board housing having front and rear faces, front and rear spaced, vertical panels one adjustable to and from the other mounted within said housing, said front panel facing and spaced inwardly of the front face of the housing, said rear panel facing and spaced inwardly of the rear face of said housing, protective circuit breaking devices and electrical leads thereto mounted on the outer face of one of said panels, control instruments mounted on the outer face of the other panel, said panel having apertures for the passage of electrical conductors therethrough, electrical conductors extending from said protective devices into the space between said front and rear panels and through said rear panel apertures to said control instruments, and doors on the front and rear faces of the housing structures providing access to the protective devices and control instruments which are mounted on said panels, said housing being also formed by said structural members to have a compartment in open vertical relation to said panels, a plurality of vertical supports spaced sidewise of each other mounted in said compartment, a group of terminal blocks for all the incoming and outgoing operating conductors mounted on said supports, conductors leading from said control instruments through the conductor apertures of the panel on which the control instruments are mounted and through the space between said panels to said terminal blocks, and a door on the housing at the said compartment affording access to said terminal blocks therein.

4. Electrical control apparatus of the character described including, in combination, structural members forming a control board housing having front and rear faces, front and rear spaced, vertical panels mounted within said housing, said front panel facing and spaced inwardly of the front face of the housing, said rear panel facing and spaced inwardly of the rear face of said housing, protective circuit breaking devices and electrical leads thereto mounted on the outer face of one of said panels, control instruments mounted on the outer face of the other panel, said panel having apertures for the passage of electrical conductors therethrough, electrical conductors extending from said protective devices into the space between said front and rear panels and through said rear panel apertures to said control instruments, and doors on the front and rear faces of the housing structures providing access to the protective devices and control instruments which are mounted on said panels, said housing being also formed by said structural members to have a compartment in vertical relation to said panels, a plurality of vertical supports spaced sidewise of each other mounted in said compartment, a group of terminal blocks mounted on said supports, conductors leading from said control instruments through the conductor apertures of the panel on which the control instruments are mounted and through the space between said panels to said terminal blocks, and a door on the housing at the said compartment affording access to said terminal blocks therein, said panels being relatively shiftable whereby they may be moved farther apart to facilitate extending the conductors through the space between them and then may be moved closer together to conserve space in the housing.

5. Electrical control apparatus of the character described including, in combination, structural members forming a control board housing having front and rear faces, front and rear spaced, vertical panels one adjustable toward and from the other mounted within the housing, said front panel facing and spaced inwardly of the front face of the housing and the rear panel facing and spaced inwardly of the rear face of the housing both of said panels having conductor apertures, protective circuit breaking devices mounted on the outer face of one of said panels, conductors leading to said protective devices, control instruments mounted on the outer face of the other panel, conductors leading from the protective devices through the conductor apertures of the panel on which they are mounted and into the space between said panels and through the conductor apertures in the other panel to the control instruments thereon, and doors on the front and rear faces of the housing affording access to the said instruments and devices on said panels, said housing being also formed by said structural members to have a compartment over said panels and another compartment under said panel, supply busses mounted in one of said compartment conductors leading from said supply busses to said protective circuit breaking devices, a plurality of vertical supports spaced sidewise of each other mounted in said other compartment, a group of terminal blocks for all of the incoming and outgoing operating conductors mounted on said supports, conductors leading from said control instruments through the conductor apertures of the panel on which the control instruments are mounted and through the space between said panel to said terminal blocks, and a door on the housing at said latter compartment affording access to said terminal blocks therein.

HILARY B. GARVIN.

REFERENCES CITED

The following references are of record in the file of this patent:

UNITED STATES PATENTS

| Number | Name | Date |
| --- | --- | --- |
| 1,626,660 | Balph | May 3, 1927 |
| 1,878,335 | Shull | Sept. 20, 1932 |
| 1,923,893 | Smith | Aug. 22, 1933 |
| 2,044,860 | Silverman | June 23, 1936 |
| 2,140,376 | Anderson | Dec. 13, 1938 |
| 2,185,562 | Nielsen | Jan. 2, 1940 |
| 2,319,415 | Lightfoot | May 18, 1943 |
| 2,394,060 | Holmes | Feb. 5, 1946 |
| 2,417,420 | Knapp | Mar. 18, 1947 |